Patented May 14, 1929.

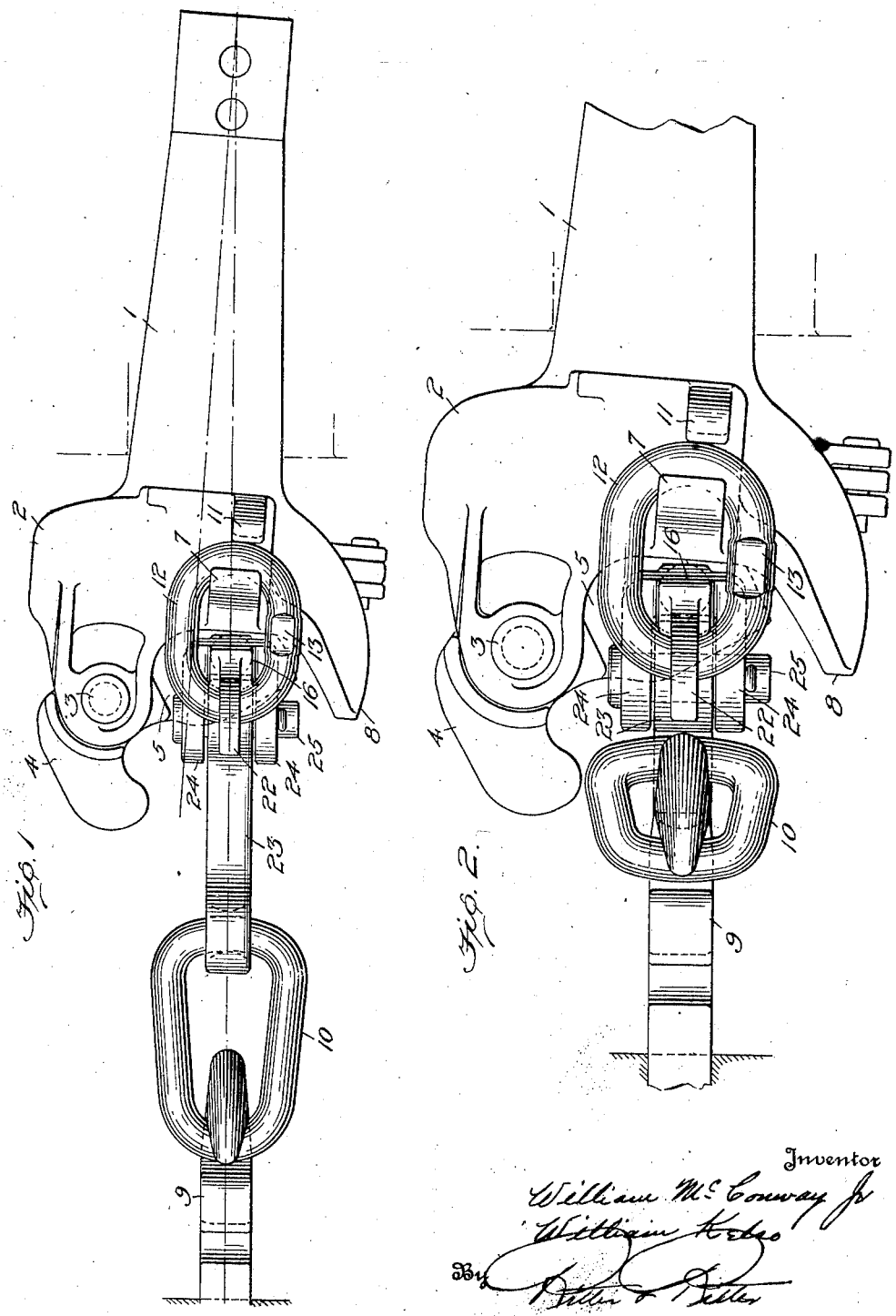

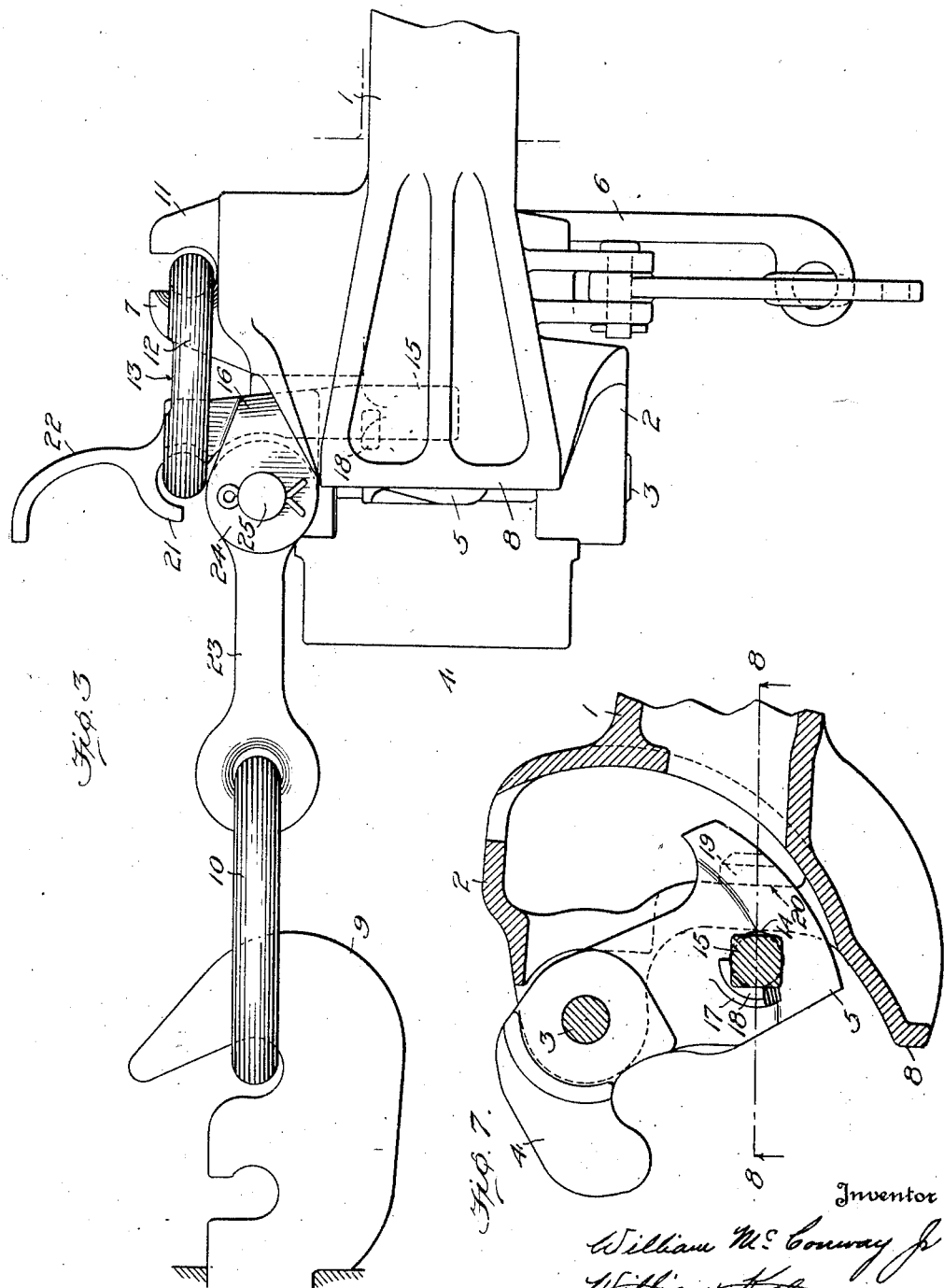

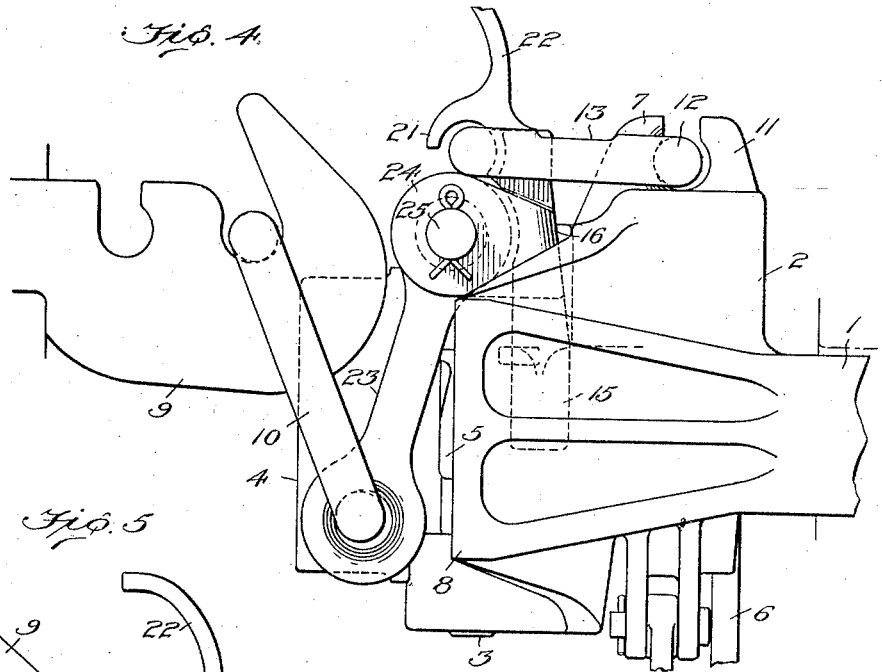
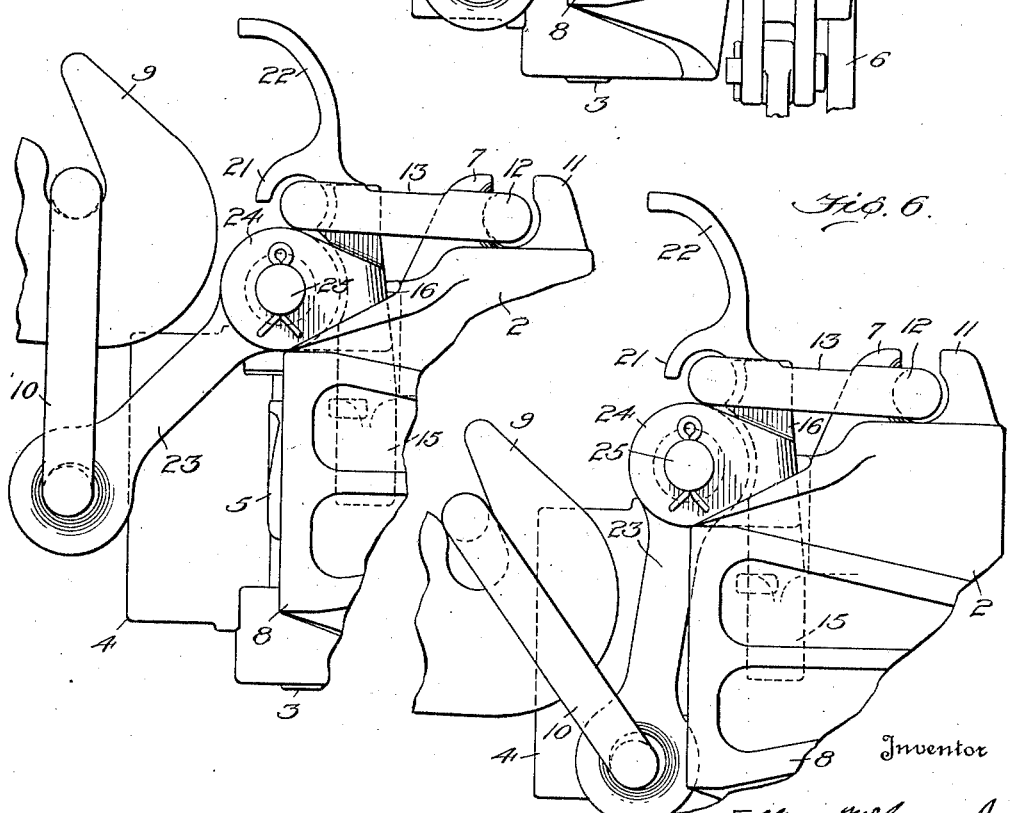

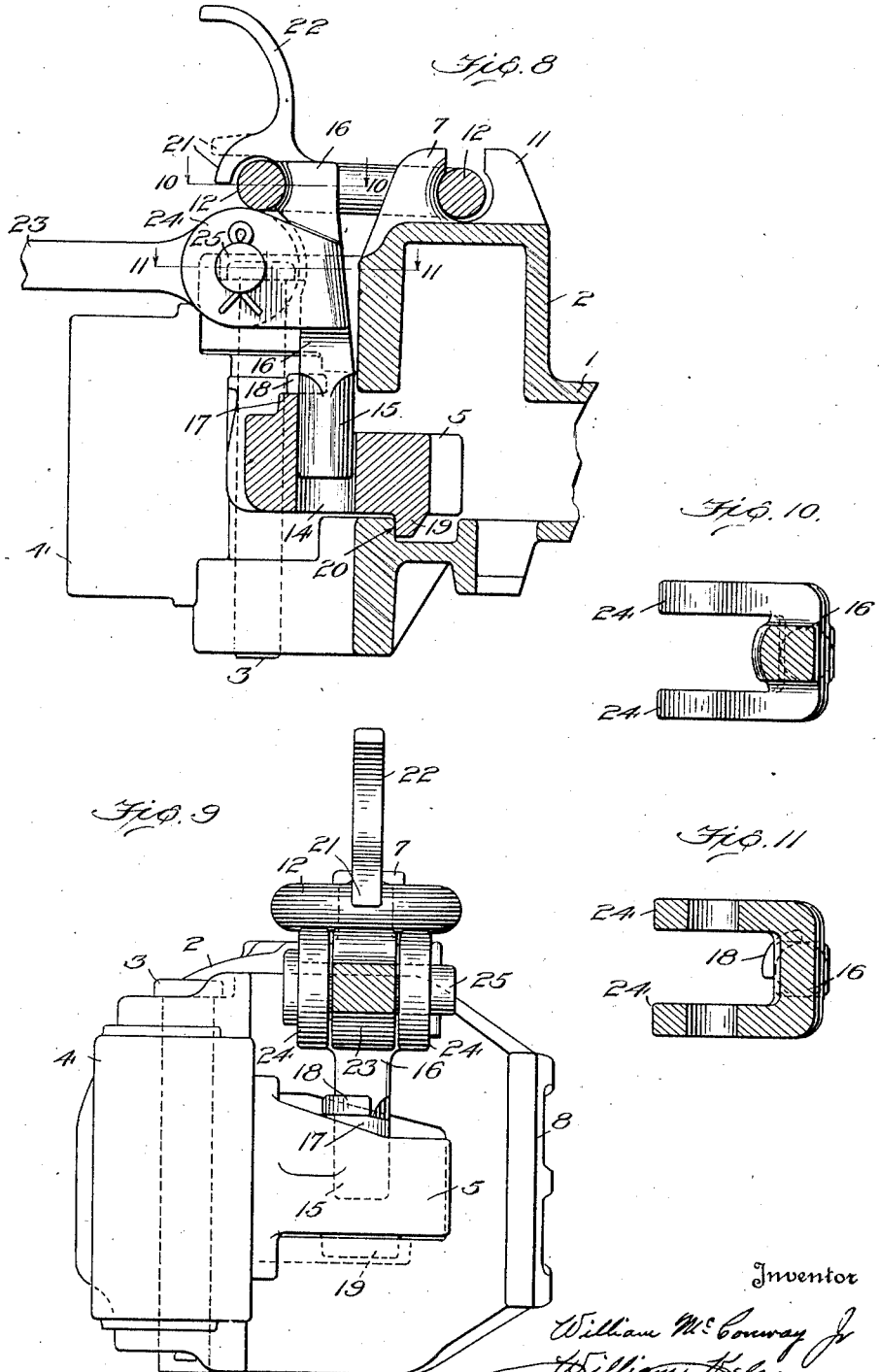

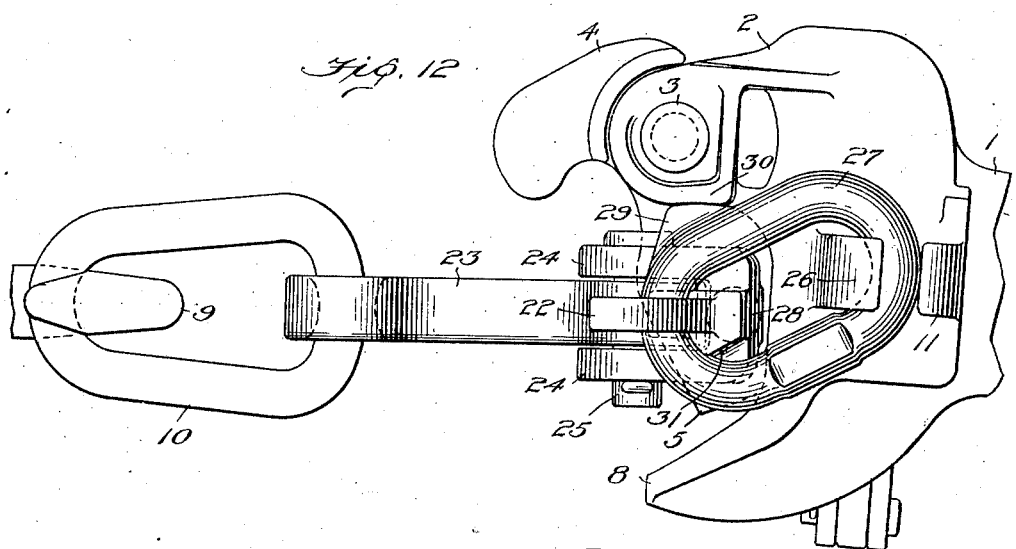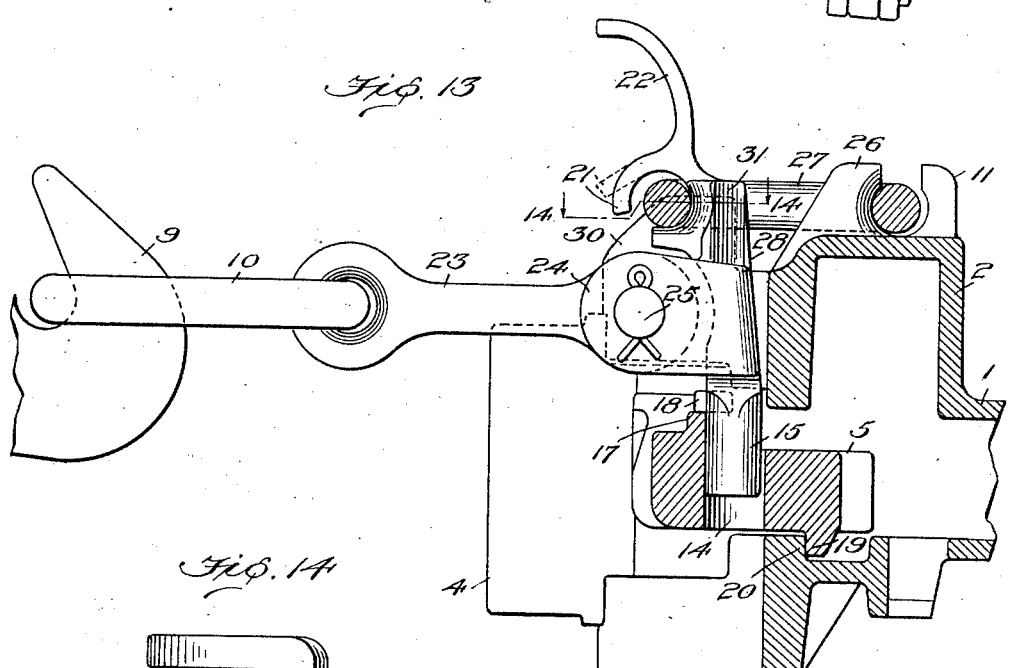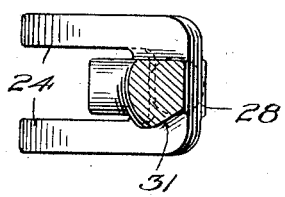

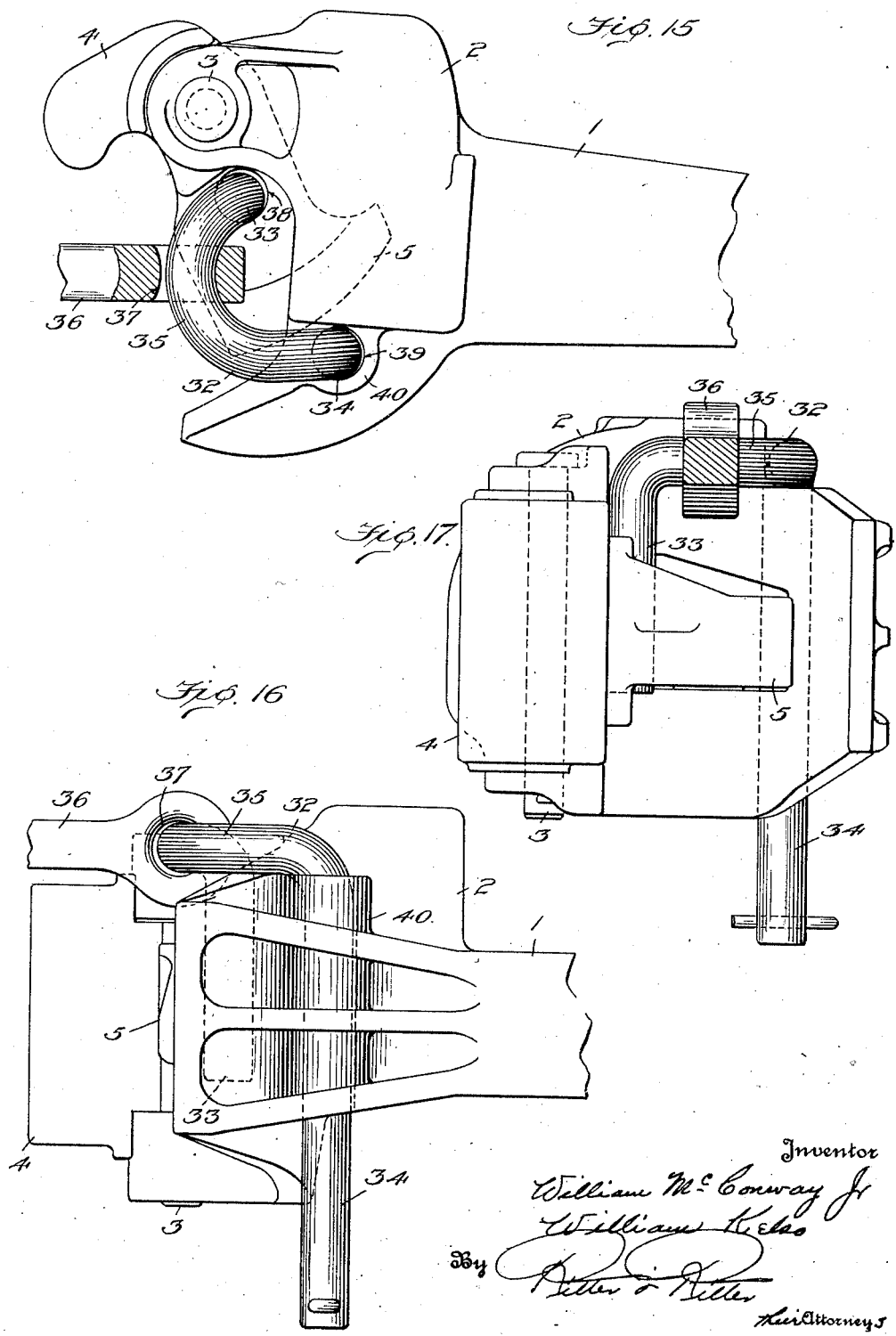

1,712,626

UNITED STATES PATENT OFFICE.

WILLIAM McCONWAY, JR., AND WILLIAM KELSO, OF PITTSBURGH, PENNSYLVANIA, ASSIGNORS TO THE McCONWAY & TORLEY COMPANY, OF PITTSBURGH, PENNSYLVANIA, A CORPORATION OF PENNSYLVANIA.

CAR COUPLING.

Application filed September 9, 1925. Serial No. 55,319.

The invention relates to car coupling mechanism for railway cars and has for its object to produce a simple, strong and reliable device for connecting a car equipped with an automatic coupler of the vertical plane type to a car employing a drawhook or the like. Devices employed for this purpose are commonly known as transition couplings. It is also an object of the invention to provide a mechanism of the character indicated in which the clearances between parts during buffing operations are amply sufficient to prevent breakage or injury of the mechanism.

A principal feature of the invention, generally stated, resides in a construction wherein the means for connecting a drawhook to a coupler of the type employing a rotatable knuckle includes a member adapted when the knuckle is open to bear against the tail of the knuckle for communicating pulling strains thereto.

A further feature of the invention consists in providing the knuckle and coupler head with cooperating means for limiting outward rotation of the knuckle so as to permit the efficient employment of a device attached to the tail of the knuckle as a means for connecting the coupler equipped with the knuckle to a coupling device of a different type.

Another feature of the invention consists in connecting the transition coupling device to the tail of the knuckle of the automatic coupler at a point which is spaced laterally from the longitudinal axis of the automatic coupler when the knuckle thereof is in open position.

Other features of the invention relating to advantageous forms and relations of parts will hereinafter appear.

In the drawings illustrating preferred embodiments of the invention

Figure 1 is a plan view of a coupler, transition gear and drawhook, the parts being connected and in pulling position.

Figure 2 is a plan view showing the position of the coupler, transition gear and drawhook when the cars are pushed together until the side buffers, normally employed in conjunction with cars equipped with drawhooks, are closed.

Figure 3 is a side elevational view of the construction illustrated in Figures 1 and 2, the parts being in pulling position.

Figure 4 is a side elevational view showing the positions assumed by the parts when the cars are pushed together until the buffers are closed.

Figure 5 is a view corresponding to Figure 4 but illustrating the positions assumed by the parts when the car to which the drawhook is attached is light or unloaded and the car to which the automatic coupler is attached is loaded.

Figure 6 is a view corresponding to Figure 4 but illustrating the relations assumed by the parts when the car to which the drawhook is attached is the low or loaded one and the car to which the coupler is attached is the high or unloaded car.

Figure 7 is a detail view partly in plan and partly in horizontal section showing a portion of the automatic coupler and the transition device.

Figure 8 is a vertical sectional view on the line 8—8, Figure 7.

Figure 9 is a view partly in section and partly in front elevation, showing the relation of the transition gear to the coupler.

Figure 10 is a detail sectional view of the post forming an element of the transition device, the view being taken on the line 10—10, Figure 8.

Figure 11 is a detail sectional view of the post element of the mechanism, the view being taken on the line 11—11, Figure 8.

Figure 12 is a plan view of a coupler, transition gear and drawhook embodying a modified form of the invention, the parts being in pulling position and the bollard with which the coupler head is provided being located in the center line of the coupler instead of being spaced laterally therefrom.

Figure 13 is a view, partly in elevation and partly in vertical section, of the mechanism shown in Figure 12.

Figure 14 is a detailed sectional view of a portion of the post forming an element of the transition gear, the view being taken on the line 14—14, Figure 13.

Figure 15 is a plan view illustrating another modified form of the invention.

Figure 16 is a side elevation of the construction shown in Figure 15.

Figure 17 is a view, partly in section and partly in front elevation, of the modified form of construction illustrated in Figures 15 and 16.

In the construction illustrated in Figures 1 to 11 inclusive of the drawings, 1 is a coupler whose stem or shank is attached to the car by means of suitable draft rigging appliances in any well known or desired manner. Rotatably mounted upon the head 2 of the coupler by means of the usual knuckle pin 3 is a knuckle 4 having a tail 5 which cooperates with a suitable lock 6 by which outward or uncoupling rotation of the knuckle is normally restrained. The top of the coupler head 2 is cast with an upwardly extending bollard 7 which preferably is spaced laterally from the longitudinal axis of the coupler toward the guard arm side 8 of the coupler head, the bollard, as will appear from an inspection of Figure 1, thus being disposed on the center line of pull of the transition device when the latter is in use. It will also be noted that this location of the bollard 7 causes the coupler 1 to swing to the knuckle side of the coupler carrier or bottom support for the coupler (not shown), thus providing, as illustrated in Figure 2, clearance during buffing operations between the nose of the knuckle 4 and the drawhook 9 for the connecting link 10 attached to the drawhook. To the rear of the bollard 7 and in spaced relation therewith is a lug 11 between which and the bollard a link 12 is received. The bollard 7 and lug 11 are preferably of the well known form illustrated and the link 12, which serves to transmit pulling strains to the coupler head, is preferably formed on one side with a flattened portion 13 of reduced cross-section which is adapted to pass between the bollard and the lug 11 so as to permit said link to be interlockingly connected to the bollard. By this means the link 12 can be inserted between the bollard and the upwardly extending lug adjacent thereto and may then be turned to a position in which, when it is assembled with other parts of the transition gear, it prevents the transition device from accidently becoming disassembled from the coupler.

The knuckle tail 5 is provided with a vertically extending opening or recess 14 for receiving the lower end portion 15 of the post member 16 forming a part of the transition gear. The opening 14 in the knuckle tail and the portion 15 of the draft post are preferably cylindrical so as to permit the post 16 to rotate around its axis thus relieving the post from the twisting strains to which it otherwise would be subjected in service when cars are passing around a curve. The top surface of the knuckle tail 5 is provided with an upwardly extending lug or wall 17 which borders the front of the opening 14 and thus increases the bearing area for resisting the pulling action of the post. The wall 17 also serves as a seat for the projecting stop lug 18 with which the draft post is provided, the post 16 being thus maintained at proper height. To limit the outward rotation of the knuckle when the transition gear is in use the knuckle tail 5 is formed on its lower surface with a lug or shoulder 19 which is adapted to bear against the shoulder 20 formed by the inside face of the lower front wall of the coupler head.

The upper end of the post 16 is supported against draft strains by means of the link 12 which passes around the bollard 7. For the purpose of movably connecting this link to the post member the latter is preferably provided at its upper end with an extension or lug 21 which, as indicated in dotted lines in Figure 8, is cast straight or open and then is bent down around the forward end of the link 12 after the latter has been placed over the post 16 when assembling the transition gear. The opening for the forward end of the link 12 formed by bending down the lug 21 is somewhat larger than the cross-sectional diameter of the link, so as to afford a slight clearance permitting the post 16 to be tilted rearwardly somewhat in the operation of lifting it out of the hole 14 in the knuckle tail. For the same purpose the opening 14 in the knuckle tail is slightly larger than the lower end of the post 16 and the rear side of the latter normally inclines forwardly away from the adjacent part of the coupler head. The forward end of the link 12 is attached to the draft post on or above a horizontal line passing through the rear end or bearing of the link against the bollard 7 or, in other words, the link 12 is attached to the post at a point which is at least as high as the point of attachment of the link to the bollard. By this means the link 12 operates to prevent the post from creeping upward out of the hole 14 in the tail of the knuckle under the influence of an upward pull induced by the drawhook 9 on a car which is higher than the car to which the automatic coupler is applied, as any accidental upward movement of the post would shorten the distance between the bearings of the link and thus prevent the post from becoming disengaged from the knuckle tail. For convenience in lifting the draft post 16 to withdraw it from the hole 14 in the knuckle tail a handle member 22 may advantageously be provided at the upper end of the post. The handle is preferably formed as a forwardly curved bar.

Above the tail of the knuckle but below the link 12 the draft post 16 is movably attached to a plurality of connected link members 10 and 23 respectively, the former being adapted to cooperate with a drawhook 9 and the latter preferably being formed as an eyebar connected at its forward end to the link 10 and pivotally connected at its rear end to the draft post 16. As a means of movably connecting the member 23 to the post the latter may advantageously be provided with a pair of spaced, forwardly extending perforated lugs 24 between which the rear end of the eye-bar 23 is received. A pivot pin 25 passing through the bar 23 and lugs 24 serves to connect these members. The link 10 is preferably made of substantially triangular form, the opening therein being wider at the rear end. This form of link enables it to be removed from the drawhook with increased freedom.

When the transition gear is not in use the draft post 16 is raised until its lower end 15 is withdrawn from the post hole 14 in the tail of the knuckle 5. The transition mechanism may then be moved or swung to one side of the coupler leaving the latter free for coupling with another automatic coupler of its own type.

In the modified form of the invention illustrated in Figures 12 to 14 inclusive the bollard 26 is positioned in the longitudinal axis or center line of the coupler instead of being spaced laterally therefrom, and the upper end of the draft post is connected to the bollard by means of a link 27 which occupies an angular position with respect to the line of pull to which it is subjected. As the bollard 26 is located on the center line of the coupler it is necessary in this form of the invention to provide means for holding the center of curvature of the forward end of the link 27 approximately in vertical alignment with the center of the hole 14 of the knuckle tail in which the lower end of the draft post 28 is placed when the transition gear is in use. This may be effected by providing one side of the link 27 toward its forward end with an extension or lug 29 which is adapted to bear against an upwardly extending wall 30 cast on the top of the upper pivot lug of the coupler head. To afford clearance permitting it to rotate when the cars are passing around a curve the draft post 28 is beveled or cut away at its upper end on the guard arm side as indicated at 31.

Due to the fact that the center line of the drawhook in the construction illustrated in Figures 12 and 13 is nearer the center line of the automatic coupler than is the case in the construction shown in the principal figures of the drawings, while the car bodies are the same distance above the rails, the dimensions of the draft post 29 differ slightly in some respects from those of the post 16 and the forwardly projecting lugs 24 are positioned at a somewhat different elevation. But apart from these differences and those features heretofore described the modified form of construction illustrated in Figures 12, 13 and 14 is the same as that shown in the principal figures of the drawings and accordingly corresponding features of construction have been identified by corresponding reference numerals.

The modified form of the invention illustrated in Figures 15, 16 and 17 involves the use of a draft member 32 formed with a plurality of vertically extending posts 33 and 34 respectively which are integrally connected at their upper ends by an arcuate bar portion 35 upon which is threaded an eye-bar or link members 36 substantially like the eye-bar 23 employed in the other forms of construction. A link 10 adapted to engage a drawhook is movably mounted on the outer end of the eye-bar 36 in the manner heretofore described. The eye at the rear end of the member 36 is rounded or flared as indicated at 37 to form a suitable bearing surface for cooperating with the curved loop portion 35 of the draft member 32.

The shorter post 33 of the draft member is adapted to enter an opening or recess 38 in the knuckle tail 5 when the knuckle is open. The longer post 34, which preferably is cylindrical throughout its length, is mounted in a correspondingly shaped aperture 39 formed in the guard arm side of the coupler head, the guard arm preferably being reinforced adjacent said aperture as indicated at 40. When this transition gear is not in use the draft member 32 can be raised vertically until its inner leg or post 33 is withdrawn from the opening 38 in the knuckle tail, after which it may be moved or swung to the guard arm side of the coupler.

It will be perceived that the invention renders unnecessary the use of a spring for holding the knuckle open when the automatic coupler is connected to cars provided with drawhooks. This is a decided advantage because such a spring creates objectionable friction between the tail of the knuckle and the knuckle lock and also between the lock and the coupler wall against which the lock bears. The friction thus induced not only results in increased wear of these surfaces but also because of the pressure upon the parts renders it more difficult to release the lock from locked position.

We claim:

1. Car coupling mechanism comprising a coupler involving a coupler head, a knuckle rotatably mounted on said head, and a lock for said knuckle, in combination with means adapted to connect said coupler to a drawhook, said means including a member adapted to bear against the tail of said knuckle for communicating draft strains thereto when the knuckle is open, means for supporting said member against draft strains at a point above the tail of the knuckle, and means movably connected to said member for connecting the latter to a drawhook.

2. Car coupling mechanism adapted to connect a drawhook or the like to a car coupler involving a coupler head, a knuckle rotatably mounted on the head, and a lock for the knuckle, said mechanism involving a plurality of movably connected link members one of which is adapted to be detachably connected to the knuckle and operating to maintain the latter in open position.

3. Car coupling mechanism adapted to connect a drawhook or the like to a car coupler involving a coupler head, a knuckle rotatably mounted on the head and provided with a tail having a recess therein, and a lock for the knuckle, said mechanism involving a member adapted to enter the recess in the tail of the knuckle when the latter is open, and means for supporting said member against draft strains at a point above the tail of said knuckle.

4. Car coupling mechanism adapted to connect a drawhook or the like to a car coupler involving a coupler head provided with a bollard, a knuckle rotatably mounted on the head, and a lock for the knuckle, said mechanism involving a post adapted to be detachably connected to the tail of the knuckle when the latter is in open position, a link for movably connecting the post to said bollard, and means movably connected to the post adapted to be detachably connected to a drawhook.

5. Car coupling mechanism adapted to connect a drawhook or the like to a car coupler involving a coupler head provided with a bollard, a knuckle rotatably mounted on the head, and a lock for the knuckle, said mechanism involving a post adapted to be connected to the tail of the knuckle when the latter is in open position, a link for movably connecting the post to said bollard, and means movably connected to the post adapted to be detachably connected to a drawhook, said link being attached to said post at a point which is at least as high as the point of attachment of the link to the bollard, whereby said link prevents the post from creeping upward under the influence of an upward pull induced by the drawhook on a car higher than that on which the post is mounted.

6. Car coupling mechanism adapted to connect a drawhook or the like to a car coupler involving a coupler head provided with a bollard which is spaced laterally from the longitudinal axis of the coupler toward the guard arm side thereof, a knuckle rotatably mounted on said head, and a lock for the knuckle, said mechanism involving a post adapted to detachably engage the tail of the knuckle when the latter is in open position, means for movably connecting the post to the bollard, and a link device movably connected to said post and adapted to cooperatingly engage a drawhook, said post being provided at its upper end with a handle member.

7. Car coupling mechanism comprising a coupler involving a coupler head, a knuckle rotatably mounted on said head, and a lock for said knuckle, in combination with means adapted to connect said coupler to a drawhook, said means including a member adapted to bear against and rotate with respect to the tail of said knuckle when the latter is in open position, means for supporting said member against draft strains at a point above the tail of the knuckle, and means movably connected to said member for connecting the latter to a drawhook.

8. Car coupling mechanism comprising a coupler involving a coupler head, a knuckle rotatably mounted on said head and having an opening in its tail, said head and knuckle having cooperating shoulders adapted to limit the extent of outward rotation of the knuckle, and a lock for the knuckle, in combination with means adapted to connect said coupler to a drawhook, said means including a post extending into said opening in the knuckle tail, a link device movably attached to said post above the knuckle tail and to the coupler head and serving to support the post against draft strains, said post having a shoulder for engaging the tail of the knuckle to limit downward movement of the post, and means movably connected to said post below said link device for connecting the post to a drawhook.

9. Car coupling mechanism comprising a coupler involving a coupler head, a knuckle rotatably mounted on said head, and a lock for said knuckle, in combination with means adapted to connect said coupler to a drawhook, said means including a post adapted to bear against and be detachably connected to the tail of the knuckle to transmit draft strains thereto when said knuckle is in open position, and a link member having an opening adapted to receive a drawhook, the opening in said link being wider at one end than at the other.

10. Car coupling mechanism comprising a coupler involving a coupler head having a bollard and an upwardly extending lug in spaced relation thereto, a knuckle rotatably mounted on said head, and a lock for said knuckle, in combination with means adapted to connect said coupler to a drawhook, said means including a post adapted to be detachably connected to the tail of said knuckle when the latter is in open position, means movably attached to said post for connecting the latter to a drawhook, and a link for connecting said post to the bollard, said link being formed with a portion of reduced cross-section which is adapted to pass between said bollard and said lug to thereby permit said link to be interlockingly connected to the bollard.

11. Car coupling mechanism comprising a coupler involving a coupler head, a knuckle rotatably mounted on said head, and a lock for said knuckle, in combination with means adapted to connect said coupler with a drawhook, said means including a post adapted to be detachably connected to the tail of said knuckle when the latter is in open position, said post having a plurality of perforated lugs, a perforated link extending between and pivotally connected to said lugs, and means connected to said post above said lugs for transmitting draft strain from the post to the coupler head.

12. Car coupling mechanism comprising a coupler involving a coupler head, a knuckle rotatably mounted on said head, and a lock for the knuckle, in combintion with means adapted to connect said coupler to a drawhook, said means involving a post adapted to enter an opening in the tail of the knuckle when the latter is in open position, means engaging said post above the tail of said knuckle for maintaining said post in substantially vertical position, and a link device movably attached to said post and adapted to cooperate with a drawhook.

13. Car coupling mechanism comprising a coupler involving a coupler head having a bollard, a knuckle rotatably mounted on said head and a lock for the knuckle, in combination with means adapted to connect said coupler with a drawhook, said means involving a post adapted to enter an opening in the tail of the knuckle when the latter is in open position, a link for connecting the post to the bollard, a triangular link adapted to cooperate with the drawhook, and a bar movably connected to said triangular link and pivotally connected to the post above the tail of the knuckle, said post being provided with spaced perforated lugs between which said bar is pivoted and also having a portion adapted to be bent so as to prevent the escape of the link by which the post is connected to the bollard.

14. As an article of manufacture, a draft member formed as a post provided on one side intermediate its ends with a plurality of spaced perforated lugs and having below said lugs a cylindrical pin portion and having a handle above said lugs and provided with a seat adapted to cooperate with a link member, said seat being on the same side as said lugs and between the latter and said handle.

In testimony whereof we affix our signatures.

WILLIAM McCONWAY, Jr.
WILLIAM KELSO.